United States Patent

Buysch et al.

[11] Patent Number: 5,463,034
[45] Date of Patent: Oct. 31, 1995

[54] POLYSACCHARIDES, PROCESS FOR THEIR PREPARATION AND THEIR USE

[75] Inventors: Hans-Josef Buysch; Alexander Klausener, both of Krefeld; Klaus Szablikowski; Klaus Balser, both of Walsrode; Michaela Wilke, Schneverdingen, all of Germany

[73] Assignee: Wolff Walsrode Aktiengesellschaft, Walsrode, Germany

[21] Appl. No.: 421,411

[22] Filed: Oct. 13, 1989

[30] Foreign Application Priority Data

Oct. 27, 1988 [DE] Germany ............ 38 36 599.5

[51] Int. Cl.$^6$ ............ C07H 15/00; A61K 31/715; C08B 15/06
[52] U.S. Cl. ............ 536/17.2; 536/17.9; 536/53; 536/30
[58] Field of Search ............ 536/53, 17.2, 17.9, 536/55.3, 30; 514/54, 57

[56] References Cited

U.S. PATENT DOCUMENTS

| | | | |
|---|---|---|---|
| 3,705,890 | 12/1972 | Barker et al. | 536/67 |
| 4,224,439 | 9/1980 | Ayers et al. | 536/43 |
| 4,330,440 | 5/1982 | Ayers et al. | 536/43 |
| 4,663,159 | 5/1987 | Brode et al. | 536/90 |
| 4,783,527 | 11/1988 | Falkowski et al. | 536/53 |
| 4,952,684 | 8/1990 | Yalpani et al. | 536/18.7 |

FOREIGN PATENT DOCUMENTS

| | | |
|---|---|---|
| 0319645 | 6/1989 | European Pat. Off. . |
| 2073901 | 10/1971 | France . |

*Primary Examiner*—David A. Redding
*Assistant Examiner*—Everett White
*Attorney, Agent, or Firm*—Sprung Horn Kramer & Woods

[57] ABSTRACT

New polysaccharides have recurring units I or a salt thereof.

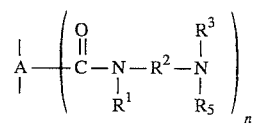

5 Claims, No Drawings

POLYSACCHARIDES, PROCESS FOR THEIR PREPARATION AND THEIR USE

The present invention relates to new polysaccharides, a process for their preparation and their use.

Basic and cationic polysaccharides are in demand as auxiliaries for paper-making, starting substances for the preparation of highly active filter materials used in the medical field and in the foodstuffs industry, and also as additives to hygiene and cosmetic cleansing and care agents. Their activity is as a rule greater the more basic and/or cationic groups they contain.

Basic polysaccharides are used inter alia as ion exchangers (U.S. Pat. No. 4,199,485) for the preparation of acid-soluble polysaccharides (U.S. Pat. No. 2,623,041) and as starting substances for the synthesis of cationic polysaccharides (c.f. U.S. Pat. No. 2,768,162).

It is thus desirable to be able to introduce substituents into polysaccharides to a greater or lesser degree, according to the particular requirements. Cellulose sulphonates have already previously been reacted with amines, in order in this way to obtain N-containing celluloses. However, the resulting degrees of substitution were inadequate (e.g. 0.8 wt. % N; c.f. Angew. Chem. 39, 1509–36 (1926)) and the yields low (c.f. J. Amer. Chem. Soc. 63, 1688–1691).

Cationization of cotton to improve its dyeability with basic dyestuffs is described in GB-PS 1 082 880 and U.S. Pat. No. 4,178,438. N-Methylol-chloroacetamide (GB-PS) or N-methylol- -amino-propionamides (US-PS) are used for this and are reacted with the fibre and then cationized with tertiary amines (GB-PS) or alkylating agents (US-PS). The degrees of substitution are low. The maximum content of basic, that is to say quaternizable, N in both cases is about 1.3 wt. %.

According to U.S. Pat. No. 3,472,840, cationic cellulose ethers are obtained by alkylation of cellulose hydroxyethyl ether with 3-chloro-2-hydroxypropyltrimethyl-ammonium chloride or with 2,3-epoxypropyl-trimethyl-ammonium chloride formed therefrom in the presence of an alkali metal hydroxide. Although the alkylating agent is often used in a large excess, the degree of substitution does not exceed the value of 0.4. Similar circumstances apply to the process of EP-A-233 336, which proposes the same alkylating agent for cationization of starch under particular more advantageous process conditions. The DS remains below 0.2.

Another variant to the process of U.S. Pat. No. 3,472,840 is proposed by EP-A 189 935, according to which hydrophobic cationic cellulose ethers are formed. Epoxy-quaternary salts are likewise used here as the alkylating agent. The results are similar to those of U.S. Pat. No. 3,472,840. The cellulose ethers known from U.S. Pat. No. 2,768,162 have higher degrees of substitution. A DS of 0.7 is quoted in the examples, because a precursor which already has this DS is used as the starting substance. The process seems to be simple and practicable. However, the starting substances are accessible only with difficulty. They can be obtained by the processes of U.S. Pat. No. 2,623,041 and U.S. Pat. No. 2,623,042 by alkylation of cellulose and cellulose ethers with dialkylaminoethyl chloride hydrochlorides. According to U.S. Pat. No. 2,623,041, the reaction is carried out in solution, it being possible to dissolve only small amounts by weight of cellulose, based on the total amount, in a highly concentrated aqueous solution of trimethylbenzylammonium hydroxide. This quaternary ammonium base is not only very expensive but also can be recovered and regenerated from the salt formed only with difficulty. In U.S. Pat. No. 2,623,042, the alkylation is supposedly carried out in suspension. This is not comprehensible, since only small amounts of cellulose per batch and, as in U.S. Pat. No. 2,623,041, large amounts of the quaternary ammonium base are in turn employed. The use of similar conditions suggests that at least partial solution of the cellulose also takes place here, this also being recognizable from the small amounts of cellulose which can be reacted. The reagent used, a dialkylaminoethyl chloride hydrochloride, behaves ambivalently under the alkylating conditions. It can react not only with the cellulose but also with itself.

In all cases, this gives dimeric to oligomeric quaternary ammonium compounds, which bond promptly with the cellulose and can fake a persistently high degree of substitution, or are merely aggregated with the cellulose and are difficult to remove by purification operations.

The misgivings expressed are supported by DE-A-25 09 937, in which a process for the cationization of ethylcellulose by alkylation with diethylaminoethyl chloride is described. In this process, on the one hand cellulose is alkylated in a heterogeneous phase system in the presence of NaOH as the base, and in spite of excess alkylating agent only low degrees of substitution of 0.1–0.22 are achieved on the tertiary amino radical. This precursor is then reacted with ethyl chloride to give amino-substituted ethylcellulose. On the other hand, the process is carried out in solution with previously prepared ethylcellulose, and this is alkylated with diethylaminoethyl chloride. Under these more favourable conditions, the degrees of substitution are also about the same under comparable conditions. Even if attempts are made to increase the degree of substitution by massive use of alkylating agent, as in examples 4 to 6, this increase achieved is only very limited, from 0.30 to 0.38. At the same time, the yield with respect to the alkylating agent employed drops disproportionately from 38% to 20%. A limit value is evidently being approached here, which cannot be exceeded even with a far higher use of alkylating agent.

All the other processes discussed so far moreover operate with cationizing agents which can react with themselves, which means that the substitution on the polysaccharide is decreased and by-products and polymers which contaminate the basic or cationic polysaccharide and possibly can no longer be removed are formed. From the formulae in U.S. Pat. No. 3,472,840 it can be seen that polyether groups with quaternary groups are grafted onto the cellulose, and in the same way as this grafting can start on a cell-O$^\ominus$ group, it can with the same probability, and if appropriate even with a higher probability, start from an OH$^\ominus$ ion, since both the ion and the alkylating agent are in solution, but the cellulose is in the heterogeneous phase.

Rapid hydrolysis to the quaternary diol is also possible (c.f. Das Papier 35 (12), 555 (1981)).

For this reason, an expensive purification and reprecipitation process is always necessary after the alkylation in order to separate the cationized cellulose from the cationic polyethers (see examples 1 to 3 of U.S. Pat. No. 3,472,840).

These difficulties are accompanied by the high price and known high toxicity of the above epoxy-quaternary salts. The circumstances which have been explained using the example of cationization with a dialkylaminoethyl chloride and epoxy-quaternary salts, that is to say the homopolymerization and self-condensation, also apply to all the other alkylating agents mentioned. The N-methylolamides of GB 10 82 880 and U.S. Pat. No. 4,178,438 are known to react readily with one another and form unusable by-products and polymers.

In accordance with the present literature, it has been recognized that cationization of polysaccharides via dialkylaminoalkyl derivatives is not practicable in the industrial field and therefore almost exclusively alkylations with the 3-chloro-2-hydroxypropyltrimethylammonium chloride mentioned in U.S. Pat. No. 3,472,840 and EP-A 233 336 or the 2,3-epoxypropyl-trimethylammonium chloride formed therefrom are carried out (c.f. Das Papier 34(1980), p. 575–579; 35 (10A), p. V 33–V 38 (1981); 35. (12), p. 555–562 (1981)).

Whichever one of the three classes of compound last mentioned is employed, because of the high toxicity strict safety measures must be observed, cationic polysaccharides obtained by this route must be purified thoroughly from by-products and all aqueous waste liquors must be worked up and disposed off because of their high content of toxic quaternary by-products, which can be undertaken only with great effort.

Since the excess alkylating reagent added to the quaternization reactions is consumed in side reactions and cannot be recovered, higher degrees of substitution are also scarcely realizable from economic aspects.

The invention was based on the object of preparing basic and cationic polysaccharides with a significant, flexibly adjustable substitution and the highest possible degree of substitution by reactions which proceed unambiguously using the cheapest possible reagents.

The present invention relates to polysaccharides with recurring units I or salts thereof of the structure Ia

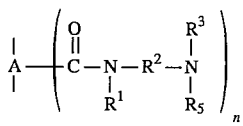

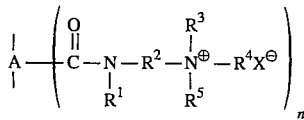

wherein

A denotes a monosaccharide unit, $R^1$ denotes H or $C_1$–$C_4$-alkyl, $R^2$ denotes an alkylene radical which is optionally substituted by at least one O or N atom, $R^3$ and $R^4$ are identical or different and denote hydrogen, a $C_1$–$C_{18}$-alkyl radical or $C_5$–$C_6$-cycloalkyl radical which is optionally substituted by OH or $OR^1$, benzyl or (meth)allyl, $R^5$ denotes a $C_1$–$C_{18}$-alkyl radical or $C_5$–$C_6$-cycloalkyl radical which is optionally substituted by OH or $OR^1$, or aryl, n denotes a number from 0.3 to 3.0 and X denotes an anion customary for polysaccharide derivatives wherein preferably in each case only one of the radicals $R^3$ to $R^5$ can be cycloalkyl or $C_6$–$C_{18}$-alkyl, and wherein $R^1$ and $R^5$ together with $R^2$ and the two N atoms can denote a preferably six-membered ring and $R^3$ and $R^5$ together with the N atom can denote a ring which can preferably contain at least one other hetero atom, in particular nitrogen and oxygen, and is preferably 5- or 6-membered.

The carbonyl group —CO— shown in the structures I and Ia is bonded to the monosaccharide ring via an oxygen atom.

In a preferred embodiment, $R^2$ is an alkylene radical which has 2 to 8 C atoms in the chain and is optionally interrupted by at least one O or N atom.

In the case where the two N atoms in I are not in one ring together, $R^2$ preferably also denotes a radical of the general structure Ib

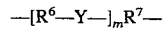

wherein $R^6$ and $R^7$ are identical or different and denote an alkylene radical which has 2 to 6 C atoms and is optionally substituted by an O atom, Y denotes the group

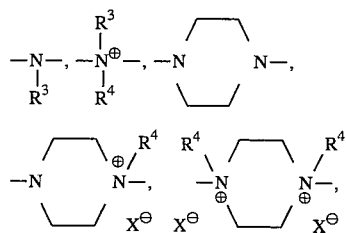

wherein $R^3$, $R^4$ and X have the abovementioned meaning, and m denotes an integer from 1 to 5.

The substituents preferably have the following meaning:

$R^1$ H, $CH_3$ $R^3$ and $R^4$ $CH_3$, $C_2H_5$, $C_3H_7$, $C_4H_9$, Cycloalkyl, $CH_2$—$CH_2$—OH, $CH_2$—$CH_2$—$OCH_3$,

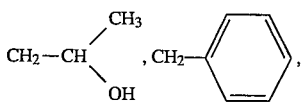

$CH_2$—CH=$CH_2$,

$R^5$ $CH_3$, $CH_2H_5$, $C_3H_7$, $C_4H_9$, Phenyl,

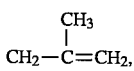

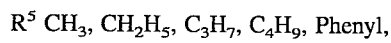

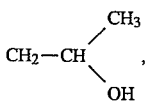

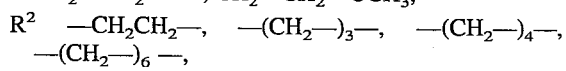

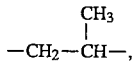

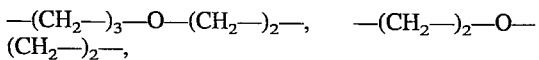

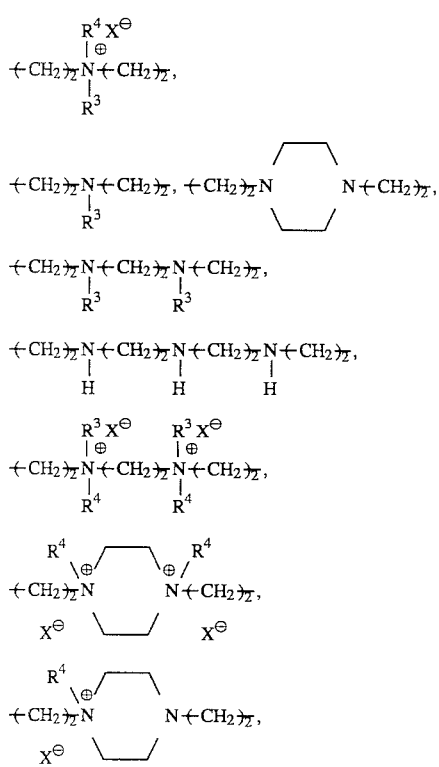
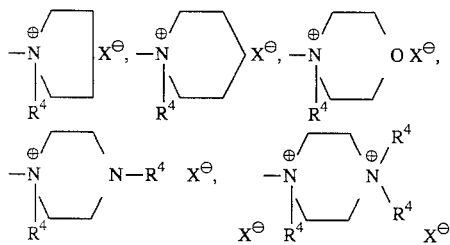

R³ and R⁵ with the N atom the group

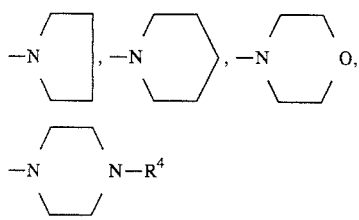

corresponding basic heterocyclic groups before salt formation or quaternization

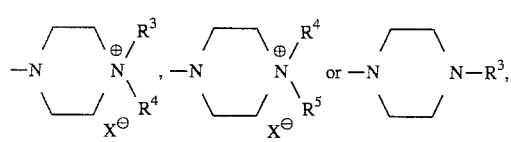

R¹, R² and R⁵ together with the N atom the group

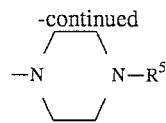

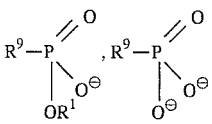

X⁻ chloride, bromide, iodide, $R^8SO_4^\ominus$, benzenesulphonate, toluenesulphonate, methanesulphonate, phosphate,

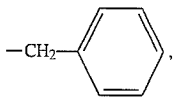

wherein R⁸ denotes H, OR¹ preferably H, OCH₃ and OC₂H₅ and R⁹ denotes OH, OR¹, R¹ preferably OH, CH₃O, C₂H₅O, CH₃, C₂H₅ m 1 to 3,
n 0.5 to 2.8.

The following meanings are particularly preferred:
R¹ H
R³ and R⁴ CH₃, C₂H₅, CH₂CH₂OH,

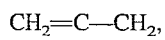

CH₂=C—CH₂,

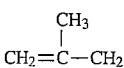

R⁵ CH₃, C₂H₅, CH₂CH₂OH
R² —(CH₂—)₂—, —(CH₂—)₃—,

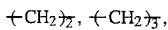

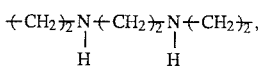

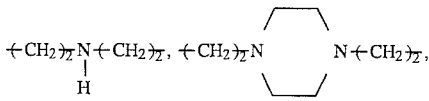

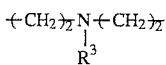

or the corresponding salt-like or quaternized groups
R³ and R⁵ with the N atom the group

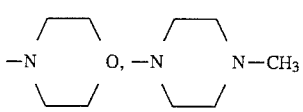

or the corresponding quaternized groups
X⁻ chloride, bromide, iodide, $R^8SO_4^\ominus$, toluenesulphonate, methanesulphonate,
m 1 to 2,
n 0.6 to 2.2.

The following meanings are especially preferred
$R^1$ H,
$R^3$, $R^4$ and $R^5$ $CH_3$, $CH_2CH_2OH$, $C_2H_5$,
$R^2$ —$(CH_2)_3$—,
$X^\ominus$ chloride, $CH_3SO_4^\ominus$
n 0.8 to 2.1.

The basic and cationic polysaccharides according to the invention are prepared by reacting carbonic acid esters of polysaccharides with suitable amines to give polysaccharides with basic groups, and if appropriate subsequently with suitable alkylating agents to give polysaccharides with cationic and/or basic and cationic groups.

These reactions proceed clearly and unambiguously. The amines and the alkylating agents do not react with themselves in obscure side reactions, and excess amounts of amine and alkylating agent can therefore be recovered and re-used.

The present invention also relates to a process for the preparation of the polysaccharides according to the invention, characterized in that polysaccharide carbonates with recurring units of the formula VI

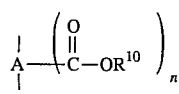

VI wherein

A denotes a monosaccharide unit, in particular a glucose or pentose unit, $R^{10}$ denotes an aliphatic radical with 1 to 18 C atoms, a cycloaliphatic radical with 5 or 6 C atoms, an araliphatic radical with 7 to 12 C atoms or an aromatic radical which is optionally substituted by halogen, $NO_2$, $COOR^1$, $OR^1$, an aliphatic radical with 1 to 6 C atoms or phenyl, wherein $R^1$ corresponds to the radical $R^1$ defined above, and n denotes an integer from 0.3 to 3.0 are reacted with amines of the structure II

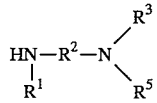

II wherein $R^1$ to $R^5$ have the abovementioned meaning and if appropriate the basic polysaccharides thus obtained, with recurring units of the structure I, are alkylated with compounds of the formula III $R^4$—X   III wherein $R^4$ has the abovementioned meaning, and polysaccharides with recurring units of the structure Ia are in this way obtained. Compound III is preferably an alkylating agent with $R^4$ as defined above, excluding hydrogen.

$R^{10}$ is preferably an aromatic radical with 6 to 10 C atoms, optionally substituted by $C_1$, $CH_3$, $NO_2$, $OCH_3$ or $COOCH_3$, particularly preferably phenyl, chlorophenyl, nitrophenyl or naphthyl, especially preferably phenyl, and n is preferably 0.5 to 2.8, particularly preferably 0.6 to 2.2 and especially preferably 0.8 to 2.1.

Polysaccharide carbonates VI are preferably prepared by reaction of polysaccharides with carbonic acid esters, in particular chlorocarbonic acid esters, in a heterogeneous phase system by a procedure in which the polysaccharide, if appropriate after pretreatment with a base, is reacted with at least one carbonic acid ester in the presence of preferably at least 0.5 wt. % moisture, and the reaction is allowed to proceed at temperatures of preferably between 10° and 120° C. for at least 3 hours. Particularly preferred polysaccharide carbonates are soluble in chloroform at 20° C. to a maximum of 20 wt. %, a maximum of 30% of the carbonate groups being cyclic carbonate groups.

Suitable starting materials for the preparation of the polysaccharide carbonates VI according to the invention are polyglucosans, such as cellulose, the various derivatives of cellulose, such as methylcellulose or mixed cellulose ethers, such as methyl-hydroxyethyl-celluloses, carboxymethylcellulose and its various salts with sodium, potassium, calcium or ammonium, especially quaternary ammonium, ions; cellulose sulphate with various counter-ions, for example of sodium, potassium, calcium, ammonium and quaternary ammonium groups; starch, dextrins and glycogen; polyfructosans, such as inulin and graminin; polymannosans and polygalactosans; and also mixed polysaccharides, such as hemicelluloses, and furthermore polyxylosans and polyarabinosans, as well as heteropolysaccharides, such as gellan, xanthan and pullulan.

Preferred starting substances are cellulose and its derivatives, starch and dextrins, and cellulose, methylcellulose, ethylcellulose, hydroxyethylcellulose, hydroxypropylcellulose, carboxymethylcellulose, salts thereof and starch are particularly preferred.

Examples of suitable amines of the formula II are the following:

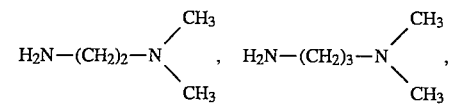

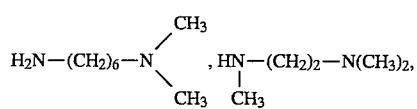

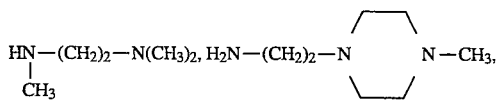

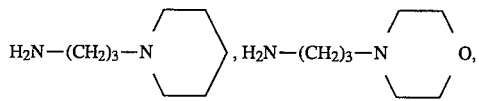

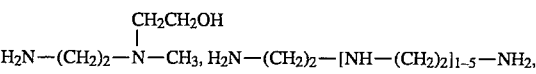

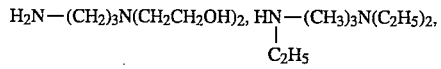

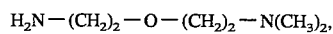

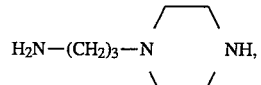

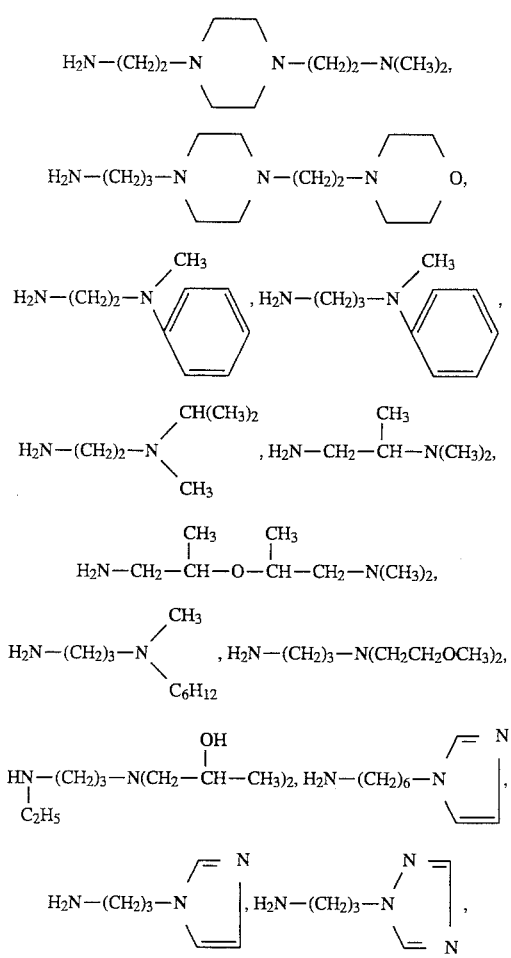

and preferred examples are:

$H_2N-(CH_2)_2N(CH_3)_2$, $H_2N-(CH_2)_3-N(CH_3)_2$,
$H_2N-(CH_2)_6N(CH_3)_2$, $H_2N-(CH_2)_3N(CH_2CH_2OH)_2$,
$H_2N-(CH_2)_3-N(C_2H_5)_2$,

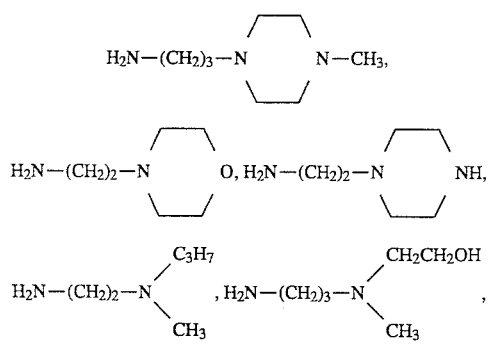

$H_2N-(CH_2)_2-NH-(CH_2)_2-NH_2$

Examples of suitable compounds III are: HCl, HBr, methanesulphonic acid, toluenesulphonic acid, phosphoric acid, benzenesulphonic acid, methanephosphonic acid, methyl chloride, ethyl chloride, propyl chloride, butyl chloride, chloroethanol, chloropropanol, epichlorohydrin, 1-chloropropane-2,3-diol, chlorobutanol, 1-chloro-2-methoxyethane, 1-chloropropan-2-ol, benzyl chloride, (meth)allyl chloride, methyl bromide, methyl iodide, methyl methanesulphonate, methyl benzenesulphonate, methyl toluenesulphonate, trimethyl phosphate, methyl 0,0-dimethylphosphonate, benzyl methanesulphonate, allyl tosylate and benzyl mesylate.

Examples of preferred compounds are methyl chloride, chloroethanol, dimethyl sulphate, methyl mesylate, methyl tosylate, (meth)allyl chloride and benzyl chloride.

The reaction of the polysaccharide carbonates VI is preferably carried out in a heterogeneous phase system at temperatures between 0° and 130° C., preferably 10° to 120° C. and particularly preferably 20° to 110° C. The solvents used are solvents which are inert under the reaction conditions, such as hydrocarbons, halogenohydrocarbons, ethers, alcohols, carboxylic acid amides and substituted ureas.

Examples of solvents which may be mentioned are cyclohexane, heptane, isooctane, benzene, toluene, xylene, chlorobenzene, dichlorobenzene, methylene chloride, chloroform, diethyl ether, diisopropyl ether, dibutyl ether, dioxane, benzodioxane, anisole, dimethoxybenzene, ethylene glycol dimethyl ether, isopropanol, isobutanol, methanol, tert.-butanol, isoamyl alcohol, dimethylformamide, dimethylacetamide, N-methylpyrrolidone and N-methylcaprolactam. These solvents can be used both in the amination and in the alkylation reaction.

The molar ratio of the polysaccharide carbonates VI to the amines II and alkylating agents III is between 1:0.5 and 1:10, preferably 1:1 to 1:8 and particularly preferably 1:1 to 1:5. Molar ratios beyond 1:10 can of course also be employed without risk.

The reaction time is in general between 1 h and 30 h, preferably 2 to 24 h and particularly preferably between 3 and 20 h.

Working up is carried out by processes which are known per se by separating off the products and washing them with solvents, in order to remove the hydroxy compound $R^{10}OH$ split off and excess amine or excess alkylating agent. By skilfully choosing the solvents, hydroxy compound $R^{10}OH$, amine and alkylating agent, these compounds can be recovered from the reaction solutions by distillation and used again.

The basic and cationic polysaccharides I and Ia according to the invention have different properties according to the starting substance and DS. If high molecular weight cellulose is used as the starting substance, water-insoluble products even at high DS are obtained which are suitable for highly active filter materials. After prior alkalization and preswelling of the cellulose, water-soluble products can also be obtained at a correspondingly high degree of substitution. Such water-soluble or water-swellable derivatives are accessible from polysaccharides of low crystallinity, such as dextrins, starch and the ethers of cellulose, such as e.g. methylcellulose.

EXAMPLES

Notes:

The molar data on the amounts of polysaccharides relate to the monomer unit. When not specifically mentioned, all the reactions are carried out on the suspended, non-dissolved polysachharide. The elemental analyses are as a rule carried out on samples dried at 105° C. in vacuo.

The following examples 1 to 6 describe the preparation of the polysaccharide.carbonates used as starting substances for the basic and cationic polysaccharides according to the invention.

Example 1

106 g (0.5 mol) of a hydroxyethylcellulose with a water content of 6.5 wt. % and a DS of 1.1 are suspended in 1 l benzene and 198 g (2.5 mol) pyridine (both dried), and after the suspension has been stirred at 50° C. for 20 h, 392 g (2.5 mol) phenyl chlorocarbonate are added in the course of 2 h. After stirring at 80° C. for a further 20 h, the mixture is cooled and the product is filtered off with suction, washed salt-free with benzene and isopropanol and dried to constant weight under a high vacuum at 50° C.

Yield: 260 g with a DS of 2.4

| Elemental analysis: | C59.4% | H4.7% |
|---|---|---|
| (Starting substance: | 46.2% | 4.5%) |

IR spectrum: intense carbonate-CO band at 1770 cm$^{-1}$

Example 2

A mat of long-fibred commercially available cellulose is pulled apart and swollen overnight in water, the flocks are comminuted in a Starmix, filtered off with suction, pressed arid dried to constant weight at 105° C. in vacuo for about 40 h, and any flocks still present are pulped in a Starmix.

81 g (0.5 mol) of the cellulose prepared in this way are suspended in 1.5 l methylene chloride and 158 g (2.0 mol) pyridine (both dried over zeolite), after addition of 2.5 g (0.14 mol) water, and the suspension is pretreated at room temperature for 20 h. 235.5 g (1.5 mol) phenyl chlorocarbonate are added dropwise at 20° to 25° C. in the course of 3 h and the mixture is further stirred at 25° for 20 h and at 45° for 5 h. After cooling, pressing off and washing with methylene chloride and isopropanol, the residue on the filter is dried to constant weight at 50° C. in vacuo.

Yield: 141 g fibrous material

| Elemental analysis: | C 55.0% | H 5.1% |
|---|---|---|
| DS 1.0 to 1.2 | | |

Example 3

314 g (2.0 mol) phenyl chlorocarbonate are added dropwise at room temperature to a suspension of 180 g (1 mol monomer) methylcellulose (4 to 5% H$_2$O) with a degree of substitution of 1.4 in 316 g (4.0 mol) pyridine and 2.0 l methylene chloride (both dried with molecular sieve Baylith T 144), which has been stirred at room temperature for 15 h, the mixture is stirred at 20° to 25° C. for a further 20 h and the product is filtered off with suction, washed salt-free with methylene chloride and isopropanol and dried to constant weight in vacuo at 50° C. 316 g of a loose material with a DS of 1.3 are obtained.

| Elemental analysis: | C58.6% | H5.29% |
|---|---|---|
| (Methylcellulose: | 49.2% | 7.1%) |

Example 4

162 g (1.0 mol) pine cellulose (6% H$_2$O) are treated with 18% NaOH for 3 h, filtered off with suction and washed alkali-free with water and water-free with pyridine. 314 g (2 mol) phenyl chloroformate are added to the suspension in pyridine in the course of 2 h and the mixture is kept at 80° C. for 12 h. The product is filtered off with suction, washed with isopropanol or water and dried at 50° C. in vacua.

Yield: 349 g, DS about 2

Example 5

53 g (0.25 mol) hydroxyethylcellulose (6–7% H$_2$O, DS 1.1), 100 g pyridine and 100 g phenyl chlorocarbonate are stirred in benzene at 20° C. for 24 h and at 80° C. for 5 h. After filtering off with suction, the product is washed with isopropanol and dried in vacuo at 50° C.

Yield: 100 g with a DS of 1.3–1.4

Elemental analysis: C 55.3% H 6.5%

Example 6

290 g (1.85 mol) phenyl chlorocarbonate are added dropwise in the course of 4 h to 100 g (0.625 mol) starch, which has been stirred in 197.5 g (2.5 mol) pyridine and 1 l benzene at room temperature for 24 h, and the mixture is further stirred at room temperature for 10 h and at 80° C. for 20 h. Filtration with suction, washing with isopropanol/water (1:2) and drying under a high vacuum gives a pale pink-coloured solid.

Yield: 200 g, DS 1.5

| Elemental analysis: | C 58.9% | H 4.5% |
|---|---|---|
| IR spectrum: | intense carbonate-CO band | |

The following examples 7 to 20 show the synthesis of the basic and cationic polysaccharides according to the invention from the polysaccharide carbonates. In example 20, a product which contains both basic and cationic groups is obtained.

Example 7

194 g (1.9 mol) 3-N,N-dimethylaminopropylamine are added to a suspension of 260 g (0.5 mol) hydroxyethylcellulose carbonate from example 1 in 1.5 l to 2.0 l dioxane and the mixture is stirred at 50° C. for 20 h. After cooling, the solvent is removed and the residue is digested with diethyl ether, washed with methanol and dried under a high vacuum.

Yield: 250 g with an N content of 11.7% and a DS of 1.9 to 2.0

IR spectrum: intense urethane-CO band at 1720 cm$^{-1}$

Example 8

80 g (1 mol) 2-chloroethanol are added to a suspension of 80 g basic hydroxyethylcellulose from example 7 in 1 l benzene and the mixture is kept at 60° C. for 20 h, while stirring. The solvent is removed and the residue is digested a few times with ether and dried under a high vacuum.

Yield: 106 g yellowish solid with an N content of 8.2% Cl content of 11.1% and DS of 1.9 to 2.0.

Example 9

141 g (0.5 mol) cellulose carbonate from example 2 and 135 g (1.33 mol) 3-N,N-dimethylamino-propylamine are stirred in 2 l toluene at 25° C. for 10 h and at 50° C. for 18 h and the product is filtered off with suction, washed with toluene, pressed off and dried at 50° C. in vacuo.

Yield: 153 g with an N content of 9.8 and a DS of 1.0

Example 10

153 g (0.5 mol) basic cellulose-urethane from example 9 are stirred with 120 g (1.5 mol) 2-chloroethanol in 2 l toluene at 50° C. for 8 h and the product is filtered off with suction, washed and dried at 50° C. in vacuo.

Yield: 150 g fibrous product with an N content of 6.2% and a Cl content of 7.0%.

This cellulose derivative is insoluble in water and organic solvents.

Example 11

200 g (0.6 mol) methylcellulose carbonate-from example 3 and 194 g (1.9 mol) 3-N,N-dimethylamino-propylamine are stirred in 1.8 l toluene at 50° C. for 10 h, the solvent is removed, the solid is stirred up 3× with toluene and washed and the residue on the filter is dried to constant weight at 50° C. in vacuo: 210 g water-insoluble product with an N content of 9.9% and a DS of 1.2.

Example 12

100 g (0.3 mol) aminocellulose from example 11 and 95 g (0.75 mol) dimethyl sulphate are stirred in 1.5 l toluene at 50° C. for 12 h. After working up with isopropanol and ligroin and drying at 50° C. in vacuo, 146 g of a water-soluble product with an S content of 8.2%, an N content of 6.3% and a DS of 1.1 to 1.2 are obtained.

Example 13

If example 12 is repeated in dioxane as the solvent, the same result is obtained.

Example 14

330 g from example 4 are stirred with 660 g 3-N,N-dimethylaminopropylamine in 4 l toluene at 50° C. for 12 h, the mixture is worked up with toluene and the product is dried in air.

Yield: 397 g with a N content of 10.7%.

Example 15

397 g from example 14 are reacted with 300 g dimethyl sulphate in dioxane at 50° C. for 12 h. Working up with dioxane and drying at 50° C. in vacuo gives 556 g water-soluble cationized cellulose with an N content of 7.6%, an S content of 9.6% and a DS of about 2.

Example 16

20 g product from example 5 and 20 g diethylenetriamine are stirred in benzene at 25° C. for 24 h. The product is filtered off with suction, washed with isopropanol and dried at 50° C. in vacuo.

Yield: 19 g with an N content of 15.0% and a DS of 1.3 to 1.4.

Example 17

30 g starch carbonate from example 6, 300 ml diethyl ether and 29 g 3-N,N-dimethylaminopropylamine are stirred at room temperature for 20 h. The liquid phase is decanted off and the solid phase is digested with diethyl ether to give a fine powder, which is filtered off with suction, washed and dried.

Yield: 20.2 g with an N content of 11.8% and a DS of 1.5.

Example 18

36 g basic starch urethane from example 17, 36 g chloroethanol and 200 ml toluene are stirred at 50° C. for 12 h, the liquid portion is decanted off and the solid portion is digested with diethyl ether, washed, filtered off with suction and dried.

Yield: 36 g water-soluble powder with an N content of 9.4% and a Cl content of 7.8%.

Example 19

If the reaction of example 17 is carried out analogously in tetrahydrofuran, 18.6 g are obtained with an N content of 11.7% and a DS of 1.5.

Example 20

15 g product from example 19, 15 g chloroethanol and 750 ml tetrahydrofuran are stirred at 50° C. for 12 h, the mixture is poured into diethyl ether and the product is filtered off with suction, washed and dried.

Yield: 13.1 g fine water-soluble powder with an N content of 10.8% and a Cl content of 2.6%.

Example 21

40 g (0.25 mol) of a commercially available pine cellulose with a water content of 6% are stirred in 500 ml benzene and 79 g (1.0 mol) pyridine at 80° C. for 15 h, 157 g (1.0 mol) phenyl chlorocarbonate are added dropwise at 10° to 20° C. in the course of 4 to 5 h and the mixture is stirred at 20° C. for 60 h and at 80° C. for 12 h. After filtration with suction, washing with water and isopropanol and drying at 105° C. in vacuo, a pulverulent cellulose carbonate remains.

Yield: 120 g with a DS of about 3.

Elemental analysis: C 61.9% H 4.1%

The above product (120 g) is stirred with 120 g 3-N,N-dimethylaminopropylamine in 1 l toluene at 50° C. for 8 h and the product is filtered off with suction, washed and dried in air.

Yield: 165 g with an N content of 13.1% and a DS of about 2.7 to 3.0.

The resulting 165 g air-dried aminocellulose are stirred with t20 g chloroethanol in toluene at 50° C. for 8 h. After working up with ligroin and toluene and drying in air, 135 g of a cellulose derivative with an N content of 11.8% and a Cl content of 6.0%, which dissolves in water, are obtained.

Example 22

44 g (0.25 mol) methylcellulose with about 5% water and a DS of 1.0, 79 g (1.0 mol) pyridine and 600 ml chloroform are stirred at 65° C. for 15 h, 157 g (1.0 mol) phenyl chlorocarbonate are added dropwise at 10° C. in the course of 3 h, the mixture is stirred at 50° to 60° C. for 13 h and the product is filtered off with suction, washed chloride-free and dried.

Yield: 106 g with a DS of 2.0

Elemental analysis: C 60.2% H 4.3%

The 106 g methylcellulose carbonate are kept with 100 g (1.25 mol) 3-N,N-dimethylamino-propylamine in 1 l toluene at 50° to 60° C. for 6 h, the mixture is worked up with ligroin and toluene and the product is washed and dried in air.

Yield: 233 g with an N content of 12% and a DS of 2.0

The product is soluble in dilute hydrochloric acid.

The 233 g basic methylcellulose urethane are kept with 160 g chloroethanol in toluene at 50° C. for 10 h. After cooling, working up with ligroin and toluene and drying in air, 261 g are obtained, after drying at 50° C. in vacuo 170 g, with an N content of 9.5%, a Cl content of 9.1% and a DS of about 2.

The product is water-soluble.

Example 23

47 g (0.30 mol) phenyl chlorocarbonate are added dropwise to a suspension of 183 g (1.0 mol) methylcellulose (about 5% $H_2O$, DS 1.4), 316 g (4.0 mol) pyridine and 1.5 l methylene chloride (both dried with zeolite A) in the course of 3 h and the mixture is stirred at 25° C. for 20 h and at 45° C. for 5 h. After working up with methylene chloride and isopropanol and drying at 50° C., 210 g are obtained. This product is reacted with 40 g (0.5 mol) 3-N,N-dimethylaminopropylamine in toluene at 50° C. in the course of 12 h. After working up with toluene and drying at 50° C., 182 g water-soluble derivative with an N content of 1.5% are obtained.

The 182 g are alkylated with 75 g dimethyl sulphate in dioxane at 50° C. in the course of 12 h. After working up with dioxane and drying at 50° C. in vacuo, 198 g water-soluble cationized cellulose with an N content of 1.3% and an S content of 3.1%, are obtained.

Use Examples

The suitability of cationic polysaccharides for the preparation of medicinal filter materials is determined by the dyestuff adsorption test.

For this, 1 g of a sample to be investigated is suspended in 1 l dist. water, 0.143 mmol (50.1 mg) of the dyestuff Betanaphthol Orange 2 are added and the mixture is stirred for 1 h. It is allowed to settle for 15 min, a few ml of the supernatant liquid are removed and filtered through a G 2 frit and the absorption is measured photometrically at 480 nm. If the absorption is still too low, a further 0.143 mmol sample dyestuff is added as often as necessary and the above procedure is repeated until the concentration of the dyestuff exceeds 0.1 mmol/l (35 mg/l).

To evaluate the test, the concentration of the dyestuff in the solution is plotted on a graph against the particular total amount of dyestuff employed. The filter action of the sample material is better the lower the dyestuff concentration at a certain total amount of dyestuff and the more dyestuff needed to exceed a concentration of 0.1 mmol/l (c.f. graph).

Results of the Dyestuff Adsorption Test

TABLE 1

| Polysaccharide from example | Substituent | g adsorb. dyestuff per g polysacch. | % content of N | % content of Cl | % content of S |
|---|---|---|---|---|---|
| 7 | amine | 0.23 | 10.6 | — | — |
| 8 | cat | 1.35 | 8.2 | 11.1 | — |
| 9 | amine | 0.27 | 10.5 | — | — |
| 10 | cat | 0.93 | 6.2 | 7.0 | — |
| 14 | amine | 0.11 | 8.3 | — | — |
| 15 | cat | 0.75 | 6.4 | — | 9.6 |

The table shows that the cationic products according to the invention have an exceptionally high adsorption activity.

Even the purely basic polysaccharides have a relatively high activity.

Comparison Example 1 and 2

271 g (1.5 mol) pine cellulose with a moisture content of about 8% are stirred in 3.6 l 6.6% aqueous sodium hydroxide solution, alkalized for 1 h, separated off from the alkali, pressed off up to 150 bar and then pulped thoroughly. 70 g of a 53% solution of 2,3-epoxypropyl-trimethyl ammonium chloride in water (0.25 mol) are then added and the mixture is kneaded at 50° C. for 5 h. After neutralization with 45 g formic acid, the product is washed with water, filtered and dried.

Products with an N content of 0.48% and a DS of 0.06 are obtained.

If the reaction is carried out analogously in suspension instead of in the kneader, the same results are obtained.

The results shown in the following table are obtained:

| Comparison experiment | % content of nitrogen | g adsorbed dyestuff per g polysaccharide |
|---|---|---|
| 1 | 0.26 | 0.12 |
| 2 | 0.48 | 0.19 |

We claim:

1. Polysaccharides containing recurring units I or a salt Ia thereof

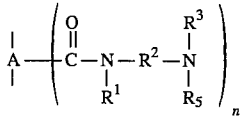

I

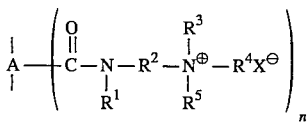

Ia wherein

A denotes a glucose or pentose monosaccharide unit, $R^1$ denotes H or $C_1$–$C_4$-alkyl, $R^2$ denotes an alkylene radical or an alkylene radical which is interrupted by an O or N atom, $R^3$ and $R^4$ are identical or different and denote hydrogen, a $C_1$–$C_{18}$-alkyl radical or $C_5$–$C_6$-cycloalkyl radical, a $C_1$–$C_{18}$-alkyl radical or $C_5$–$C_6$-cycloalkyl radical which is substituted by OH or $OR^1$, benzyl or (meth)allyl.

$R^5$ denotes a $C_1$–$C_{18}$-alkyl radical or $C_5$–$C_6$-cycloalkyl radical, a $C_1$–$C_{18}$-alkyl radical or $C_5$–$C_6$-cycloalkyl radical which is substituted by OH or $OR^1$, or aryl, n denotes a number from 0.8 to 3.0 and $X^\ominus$ denotes a chloride, bromide, iodide, sulphate, toluenesulphonate or methanesulphonate anion, or $R^1$ and $R^5$ together with $R^2$ and the two N atoms can denote a ring, or $R^3$ and $R^5$ together with the N atom can denote a ring.

2. Polysaccharides according to claim 1, wherein $R^2$ denotes a radical $$—(R^6—Y—)_m R^7—\qquad\text{Ib}$$

wherein

R$^6$ and R$^7$ are identical or different and denote an alkylene radical which has 2 to 6 C atoms, or an alkylene radical which has 2 to 6 carbon atoms and is interrupted by O atom, Y denotes any one of the group comprising

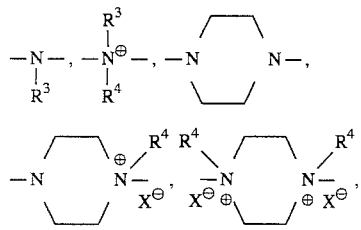

m denotes an integer from 1 to 5, and the balance of the radicals are as defined in claim 1.

3. Polysaccharides according to claim 1, wherein

R$^1$ denotes hydrogen,

R$^2$ denotes —(CH$_2$—)$_3$—,

R$^3$, R$^4$ and R$^5$ denote CH$_3$, CH$_2$CH$_2$OH or C$_2$H$_5$,

X$^\ominus$ denotes chloride or CH$_3$SO$_4^\ominus$, n denotes 0.8 to 2.1 and

A denotes a glucose or pentose unit.

4. Polysaccharides according to claim 1, wherein the monosaccharide unit A is linked to a cellulose glucose unit or a substituted cellulose glucose unit.

5. A filter material comprising a polysaccharide according to claim 1.

\* \* \* \* \*